United States Patent [19]
Brenner et al.

[11] Patent Number: 4,958,811
[45] Date of Patent: Sep. 25, 1990

[54] HYDRAULICALLY DAMPING ELASTIC BEARING

[75] Inventors: Heinz Brenner, Ahrweiler; Horst Reuter, Oberbachem, both of Fed. Rep. of Germany

[73] Assignee: Boge AG, Eitorf, Fed. Rep. of Germany

[21] Appl. No.: 358,393

[22] Filed: May 26, 1989

[30] Foreign Application Priority Data

May 30, 1988 [DE] Fed. Rep. of Germany ....... 3818287

[51] Int. Cl.$^5$ ............................................. F16F 5/00
[52] U.S. Cl. ................................... 267/140.1; 267/219
[58] Field of Search ................... 123/192 R; 248/562; 267/140.1 R, 140.1 C, 217, 218, 219

[56] References Cited

U.S. PATENT DOCUMENTS

| | | | |
|---|---|---|---|
| 3,698,703 | 10/1972 | Hipsher | 267/140.1 C X |
| 4,700,934 | 10/1987 | Andrä et al. | 267/140.1 C |
| 4,771,990 | 9/1988 | Domer et al. | 267/140.1 C |
| 4,817,926 | 4/1989 | Schwerdt | 267/140.1 C |

FOREIGN PATENT DOCUMENTS

| | | |
|---|---|---|
| 2703038 | 9/1981 | Fed. Rep. of Germany . |
| 2755117 | 1/1985 | Fed. Rep. of Germany . |
| 0009318 | 1/1986 | Japan ............................ 267/140.1 C |

*Primary Examiner*—Duane A. Reger
*Attorney, Agent, or Firm*—Nils H. Ljungman & Associates

[57] ABSTRACT

A hydraulically damping elastic bearing comprises an outer tubular member and an inner tubular member disposed radially inwardly of the outer tubular member to be separated therefrom. An elastic member is disposed between the inner and outer tubular members and has at least one chamber filled with a damping medium. At least one elastic radial stop is mounted to extend at least partially from the outer tubular member toward the inner tubular member. The elastic radial stop is disposed outside of and displaced from the chamber of the elastic member. Such an elastic radial stop may be resiliently deformed to produce a radial force on the inner tubular member and the outer tubular member by a wedge which is disposed between an extended end of the elastic radial stop and the inner tubular member. Alternatively, the extended end may be radially spaced from the inner tubular member by a predetermined radial distance and a different wedge may be disposed between the extended end and the inner tubular member. The wedge can have a radial height that is less than the predetermined radial distance. As a result, the wedge may simply limit a movement of the extended end toward the inner tubular member prior to any resilient deformation of the elastic radial stop.

4 Claims, 2 Drawing Sheets

4,958,811

HYDRAULICALLY DAMPING ELASTIC BEARING

BACKGROUND OF THE INVENTION

1. Field of the Invention:

This invention relates to a hydraulically damping elastic bearing comprising an inner tube, an outer tube which is concentric or eccentric relative to the inner tube and is located at some distance from the inner tube, and an elastic part inserted between them. The elastic part includes at least one chamber filled with damping medium. The bearing also includes at least one elastic stop.

2. Description of the Prior Art:

The prior art includes elastic bearings, such as those disclosed in German Pat. No. 27 03 038 and German Pat. No. 27 55 117, which comprise an external bearing sleeve and an internal portion held inside by an elastomer body, whereby the elastomer body has recesses above and below the inner part as an elastic chamber. The metal inner part, on part of the outside adjacent to the recesses, has a space, in which an elastic stop is inserted. When such stops are used in the inside of a chamber filled with hydraulic fluid of a hydraulically damping elastic bearing, noises occur when the elastic bearing is prestressed and simultaneously twisted, since the elastic stop pad slides backward along the inside wall of the outer tube as a result of the stick-slip effect. This noise can, of course, be reduced by a suitable flexible configuration of the rubber stop pad, by plastic slide bushings or by liquids with better sliding characteristics, but it cannot be eliminated. These patents are incorporated herein by reference as if the entire contents thereof were fully set forth herein.

OBJECTS OF THE INVENTION

It is an object of this invention to provide a hydraulically damping elastic bearing having at least one elastic stop that is resiliently deformed to produce a prestressed condition in the bearing.

It is another object to provide such a bearing which prevents noise when twisted during the prestressed condition.

It is a further object to provide such a bearing which can be economically adapted for use in various applications with different prestressed conditions.

SUMMARY OF THE INVENTION

These and other objects of the invention are provided in a preferred embodiment thereof in which the stop is located at an outside region the elastic portion and extends radially between the inner tube and the outer tube.

The preferred embodiment is advantageous because the stop is disposed at some distance from the chamber filled with damping medium and is located at at least one of the ends of the elastic bearing. As a result of the displacement of the base of the stop pad outward, the radius of friction and thus the movement when the elastic bearing is twisted are reduced by approximately half. In this manner, noise caused by the elastic body can be eliminated, even when the stop is resiliently deformed to cause the elastic bearing to be under a prestressed condition.

In accordance with an additional important characteristic, there is at least one stop at each end of the elastic bearing.

In one embodiment of the invention, the stop is integrally formed with at least one of the inner and outer tubes and is in a prestressed condition.

In another embodiment of the invention, the prestressed condition is produced by means of at least one wedge.

In accordance with an additional important characteristic, at least one wedge is fastened by means of a retaining ring.

An additional important characteristic provides for the use of wedges having different thicknesses.

In a preferred embodiment, it becomes possible to achieve a perfect centering and positioning of the stop, because the inner tube has an outside cross section which is not round. The retaining ring is provided with an opening having a corresponding inner surface to match the outside cross section of the inner tube for support of the ring thereon.

The preferred embodiment is also advantageous because the same elastic bearing with a soft suspension characteristic can be shifted into higher or lower load ranges by the predetermined amount of resilient deformation of the stop body. The amount of deformation may be changed by the use of wedges of different thicknesses. Because of the variable prestress condition of the stop produced by the use of different wedges, different load specifications can be met for vehicles of different weights, while using the same elastic bearings. Ideally, different bearing variants can be produced while only one vulcanizing mold is necessary, since the variation of the prestress condition is produced by wedges of different thicknesses.

Generally, the objects of the invention are provided in a preferred embodiment including a hydraulically damping elastic bearing which comprises an outer tubular member and an inner tubular member disposed radially inwardly of the outer tubular member to be separated therefrom. An elastic member is disposed between the inner tubular member and the outer tubular member. The elastic member has at least one chamber filled with a damping medium. At least one elastic radial stop is mounted to extend at least partially between the outer tubular member and the inner tubular member. The elastic radial stop is disposed outside of and displaced from the chamber of the elastic member.

Additionally, the outer tubular member and the inner tubular member may have corresponding first ends and corresponding second ends with an elastic radial stop being disposed at each of the first ends and the second ends. The elastic radial stops may be integrally formed with the elastic member to extend from the outer tubular member toward the inner tubular member. The elastic radial stop may be resiliently deformed to produce a radial force on the inner tubular member and the outer tubular member by a wedge which is disposed between an extended end of the elastic radial stop and the inner tubular member.

On the other hand, the elastic radial stop may include an extended end which is radially spaced from the inner tubular member by a predetermined radial distance. A different wedge may be disposed between the extended end of the elastic radial stop and the inner tubular member. The different wedge may include a radial height which is less than the predetermined radial distance. As a result, the radial height can be selectively chosen to limit a movement of the extended end of the elastic radial stop toward the inner tubular member prior to any resilient deformation of the elastic radial stop.

BRIEF DESCRIPTION OF THE DRAWINGS

Preferred embodiments of the invention are schematically illustrated in the drawings.

DESCRIPTION OF THE PREFERRED EMBODIMENTS

Figure 1:
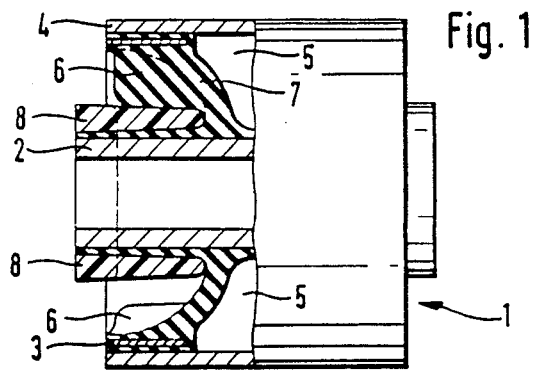
FIG. 1 is a partial cross-sectional view of a preferred hydraulically damping elastic bearing including various features of the invention as seen along line I—I of FIG. 2.

The hydraulically damping elastic bearing 1 illustrated in FIG. 1 comprises an inner tube 2 and an outer tube 4 with the outer tube 4 being oriented concentrically to the inner tube 2 and at some distance from the inner tube 2. An elastic part 7 is inserted between the inner tube 2 and the outer tube 4 and includes chambers 5 which are filled with damping medium. These chambers 5 filled with damping medium communicate with one-another hydraulically through passage 10 (FIG. 4) which may be in numerous alternative forms as discussed hereinbelow. The radially and axially outside region of the elastic portion 7 is connected to an outer part 3, which tends to reinforce the elastic portion 7, for proper retention in the outer tube 4.

FIG. 1 is a partial cross-sectional view of the preferred bearing 1, and therefore only shows the interior of a first end of the bearing 1. The second end of the bearing 1 is similar to the first end and will therefore include a similar configuration of elements for a balanced dampening effect between the inner tube 2 and the outer tube 4.

At each end of the tubes 2, 4, on the end surface of the hydraulically damping elastic bearing 1, there are upper and lower stops 6. The stops 6 extend radially inwardly and include extended ends which terminate at some distance from the inner tube 2. The base of each stop 6 is securely connected to the outer part 3, for example, by vulcanization, and may be integrally formed with the outer region of the elastic portion 7 in a recess formed at the end thereof.

Each of the stops 6 tends to restrict or limit the relative radial movement of the inner tube 2 and the outer tube 4 in a radial direction generally aligned with their direction of extension between the tubes 2, 4. The restrictions or limits provided by the stops 6 are independent of the general dampening effect that is created by the movement of the dampening medium within a chamber 5 or between two chambers 5.

However, the preferred bearing 1 includes features to alter the restrictions or limits provided by the stops 6 and, further, to directly establish or alter the damping characteristics of the bearing 6 in a radial direction. It has been found that for some installations it is desirable to establish a "prestressed" condition within the bearing 1. The bearing 1 is in a prestressed condition if one of the stops 6 at each end of the bearing 1 is initially resiliently deformed to produce an initial radial force on the inner tube 2 and the outer tube 4 tending to increase the radial distance therebetween at the circumferential location of the one stop 6.

In the preferred bearing 1, the prestressed condition of the upper stop 6 is produced by an axially inserted wedge 8. As seen at the upper stop 6 of FIGS. 1 and 2, the wedge 8 installed between the extended end of the upper stop 6 and the inner tube 2 tends to resiliently deform the upper stop 6 in a direction as generally indicated by the arrow F. The deformation of such an elastic stop 6 in this manner produces a prestress in the bearing 1 as a radial force is created which tends to radially separate the inner tube 2 and the outer tube 4 in the region of the upper stop 6.

While the one wedge 8 at the upper stop 6 tends to resiliently deform the upper stop 6, there is included in the preferred bearing 1 another wedge 8 at the lower stop 6 which also can affect the overall damping characteristic of bearing 1. Specifically, the wedge 8 at the lower stop 6 does not make contact with the extended end thereof but simply includes a radial thickness which alters the space between the extended end of the lower stop 6 and the inner tube 2. In other words, the insertion of the wedge 8 at the lower stop 6 limits the amount of possible deflection of the elastic portion 7 as the lower stop 6 moves toward the inner tube 2. Such a condition would occur if an outside force were to be applied to the outer tube 4 in a direction as indicated by the arrow F. As a result, the distance between the wedge 8 and the extended end of the lower stop 6 will allow relative radial movement of the inner tube 2 and the outer tube 4 in the region of the lower stop 6 to be basically controlled by the movement of hydraulic damping medium in the chambers 5. However, the resulting distance between the extended end of the lower stop 6 and the wedge 8 adjacent thereto will tend to limit and restrict the movement allowed by the chambers 5 without any resilient deformation of the lower stop 6. Once the desired limits to the radial movement are exceeded, the extended end of the lower stop 6 will be brought into contact with the wedge 8. Resilient deformation of the lower stop 6, which will occur when the movement exceeds the limits, causes a resulting radial force between the inner tube 2 and the outer tube 4.

As mentioned above, the preferred bearing 10 would include a preformed and configured arrangement for the upper stop 6 and the lower stop 6. By proper selection of the wedges 8, the amount of prestress in either of the stops 6 and the amount of unrestricted movement of the other stop 6 could be altered depending on the radial height of the wedges installed therein.

Figure 2:
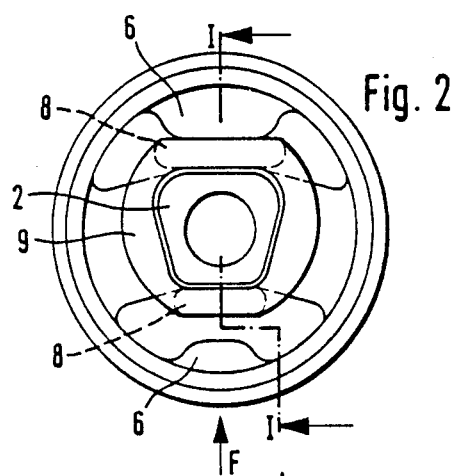
FIG. 2 is an end view of the elastic bearing illustrated in FIG. 1.

For a proper axial installation of the wedges 8, the preferred wedges 8 are produced in a one piece structure including a retaining ring 9. The retaining ring 9 is generally centered on and supported by the inner tube 2. As seen in FIG. 2, the preferred inner tube 2 has a cross section which is not round, so that it becomes easy to center and support the retaining ring 9 and the wedges 8 thereon.

Figure 3:
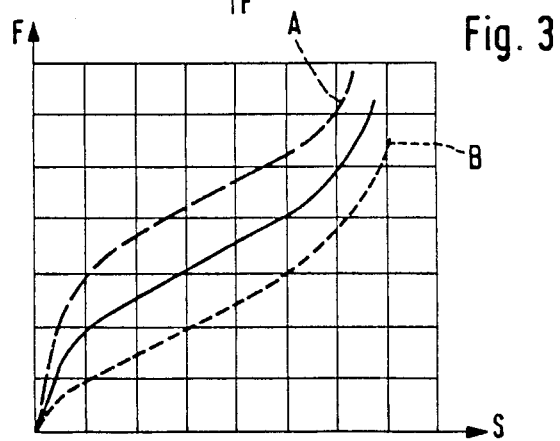
FIG. 3 illustrates various suspension characteristics which can be achieved by the use of the preferred wedges of different thicknesses.

FIG. 3 shows a force-displacement diagram for the preferred hydraulically damping elastic bearing 1 at the upper stop 6 thereof. The solid line represents a soft suspension characteristic which is achieved when the stop 6 is generally deformed in the manner shown in FIGS. 1 and 2. A corresponding force F will generally be produced for each amount of displacement S in the direction as indicated by the arrow F of FIG. 2. However, with different thicknesses of the wedges 8, the suspension characteristic can be shifted into a Characteristic A of a higher load range or a Characteristic B of a lower load range.

Figure 4:
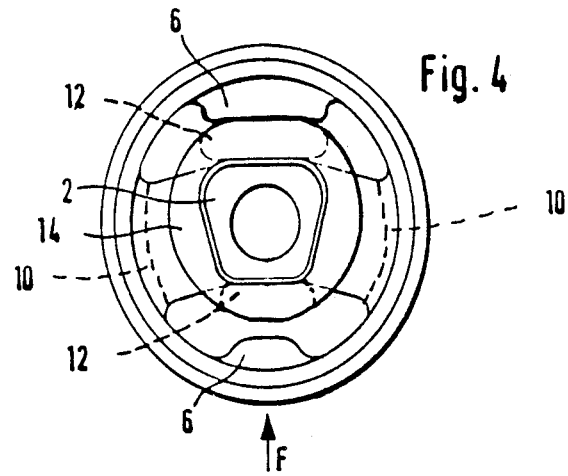
FIG. 4 is an end view like that of FIG. 2 including a different wedge configuration and other features of the invention.

As seen in FIG. 4, wedges 12 of different radial thicknesses have been installed on a common ring 14 to alter the suspension characteristics of the preferred bearing 1 in the region of the upper stop 6 and to alter the limits of the radial movement in the region of the lower stop 6. Specifically, the wedge 12 at the upper stop 6 is thicker to create a greater resilient deformation of the upper stop 6. Accordingly, the suspension characteristic in the region of the upper stop 6 will be similar to that shown as Characteristic A in FIG. 3. Additionally, the wedge 8 at the lower stop 6 is also thicker to reduce the limits for radial movement at the lower stop 6 to cause it to be resiliently deformed with a smaller amount of relative radial movement between the inner tube 2 and the outer tube 4.

It should also be noted that the end view of FIG. 4 includes a general indication of the location of possible passages between the chambers 5. The passages 10 may include various shapes, forms and locations to vary the damping characteristics of the bearing 1 as the hydraulic medium.

To further illustrate the type of chambers and passages that may be incorporated in the preferred bearing 1, additional bearings B, B' and B" are shown in FIGS. 5, 6, 7 and 8.

Figure 5:
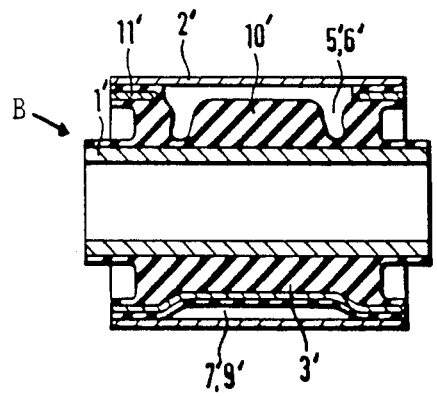
FIG. 5 is a sectional side view of another hydraulic damping elastic or rubber bearing showing the types of chambers and connecting passages which could be included in the bearing of FIG. 1.

The hydraulic damping elastic or rubber bearing B, as shown in FIG. 5, comprises an internal tube 1', an intermediate tube 11' located at some distance from the internal tube 1', and an elastic or rubber part 3' inserted therebetween. The intermediate tube is primarily for reinforcement of the part 3' and can include portions which are either concentrically or eccentrically disposed with respect to the internal tube 1'. Basically, the internal tube 1' and an external tube 2', which is disposed around but radially separated from the internal tube 1', are separated by the elastic or rubber part 3' therebetween. In the elastic or rubber part 3', there are chambers 5', 6' in the form of cavities which are filled with damping medium and hydraulically connected to one another by means of a throttle passage 4'.

The throttle passage 4' is basically formed as a recess in the elastic or rubber part 3' with the interior wall of the external tube 2' defining the remainder thereof. The throttle passage 4' is preferably located adjacent a portion of the intermediate tube 11'. As a result, the reinforcement provided by the intermediate tube 11' during relative movement of the internal tube 1' and the external tube 2' will prevent the undesired collapse or closure of the throttle passage 4'.

The chambers are partially defined by the part 3' and then closed on the outside by means of an external tube 2' to define the remainder thereof. The cylindrical internal tube 1' and the intermediate tube 11' are preferably attached to a part 3' of rubber by vulcanization. The chambers 5', 6' are cavities formed in the outer circumference of the elastic or rubber part 3' to include a projecting rubber stop cam 10' in each chamber. In the bearing B, the stop cams 10' are used to provide a defined spring characteristic when there is a load in either direction, as indicated by the arrows, after the external tube 2' comes in contact with the stop cam 10'. Clearly, such stop cams 10' may not be necessary or even desirable for use in the preferred bearing 1 of FIGS. 1, 2 and 4.

In the lower portion of FIG. 5, a valve 7' is shown in the form of an elastic or rubber lip 9'. The elastic or rubber lip 9' is preferably located in a passage 8', which also connects the chambers 5' and 6', and tends to close the passage 8' between the two chambers 5' and 6'. When oscillations having large amplitudes occur, the increased internal pressure in one chamber 5', 6' deflects the elastic or rubber lip 9' and opens the passage 8' as a bypass for the throttle passage 4'.

Figure 6:
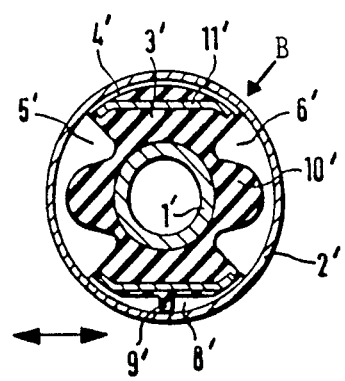
FIG. 6 is a cross-sectional end view of the bearing illustrated in FIG. 5 showing the relationship of the chambers and the passages.

FIG. 6 shows, in cross section, the internal tube 1', the intermediate tube 11' with the interposed elastic or rubber part 3', and the external tube 2'. The chambers 5' and 6' are connected to one another by the throttle passage 4'. The flow cross section of the passage 8' is preferably larger than the flow cross section of the throttle passage 4'. The rubber lip 9' acts as a valve 7' and tends to close the passage 8'. However, when there is an increased pressure in one of the two chambers 5', 6', the elastic or rubber lip 9' is laterally deflected to allow the damping medium to flow from one chamber to the other.

Figure 7:
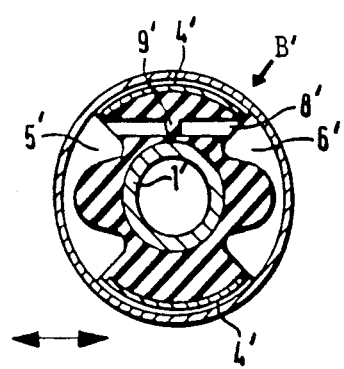
FIG. 7 is a cross-sectional end view of an alternative bearing with different valves and passages.

FIG. 7 illustrates another embodiment of a bearing B' in which the chambers 5' and 6' are connected to one another by two throttle passages 4'. The passage 8' of the embodiment is formed in the vicinity of the internal tube 1', so that the elastic or rubber lip 9' tends to cooperate or work with an external wall of the internal tube 1'.

Figure 8:
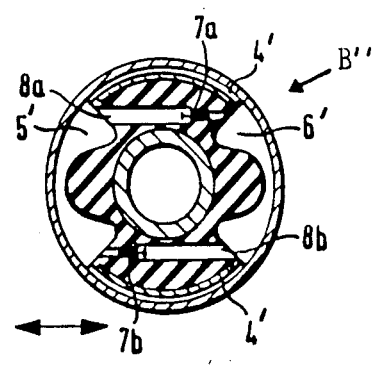
FIG. 8 is a cross-sectional end view of another alternative bearing with different valves and passages.

FIG. 8 illustrates still another embodiment of an elastic or rubber bearing B", in which the two chambers 5' and 6' are connected to one another by two throttle passages 4'. In this embodiment, there are also a pair of passages 8a and 8b, one for each direction of flow of the damping medium. Each of the passages 8a, 8b respectively includes a mechanical valve 7a and 7b including a ball and corresponding spiral spring which serve as the valve. Oscillations with large amplitudes are absorbed by the corresponding passage 8a or 8b, depending on the direction of the pressure.

While the bearings B, B' and B" include some elements and features which may not be included in the preferred bearing 1, they include other elements and features relating to the passages between the chambers which could clearly be incorporated in the preferred bearing 1.

Additional hydraulic damping bearings are disclosed in German Patent Publication Published for Opposition Purposes No. 19 42 853, German Laid Open Patent Appln. No. 36 17 787, German Laid Open Patent Appln. No. 36 31 620, European Laid Open Patent Appln. No. 234,966 and U.S. Pat. No. 4,690,389. These patents and patent applications are incorporated herein by reference as if the entire contents thereof were fully set forth herein.

Generally, the preferred hydraulically damping elastic bearing 1 comprising an inner tube 2, an outer tube 4 which may be concentric or eccentric in relation to the inner tube 2 and located at some distance from the inner tube 2. An elastic part is inserted between the tubes 2, 4 and include at least one chamber 5 filled with damping medium. At least one elastic stop 6 is characterized by the fact that the stop 6 is located outside the elastic part 7 and extends radially between the inner tube 2 and the outer tube 4.

The elastic bearing may be characterized by the fact that on each end surface of the elastic bearing 1 there is at least one stop 6. The stop 6 may be rigidly or firmly connected to the inside tube 2 or outside tube 4 and may be prestressed. Such prestressing may be produced by at least one wedge 8.

Each wedge 8 is preferably fixed by means of a retaining ring 9. The elastic bearing 1 may be characterized by the fact that the inner tube 2 has a cross section which is not round and the retaining ring 9 has a corresponding inner surface. Finally, the preferred elastic bearing 1 could include characteristics which could be altered by the use of wedges 8 having different thicknesses.

The invention as described hereinabove in the context of the preferred embodiments are not to be taken as limited to all of the provided details thereof, since modifications and variations thereof may be made without departing from the spirit and scope of the invention.

What is claimed is:

1. A hydraulically damping elastic bearing comprising:
   an outer tubular member;
   an inner tubular member disposed radially inwardly of said outer tubular member to be separated therefrom;
   an elastic member disposed between said inner tubular member and said outer tubular member;
   said elastic member having at least one chamber filled with a damping medium;
   at least one elastic radial stop means mounted to extend at least partially between said outer tubular member and said inner tubular member;
   said at least one elastic radial stop means being disposed outside of and displaced from said chamber of said elastic member;
   said outer tubular member and said inner tubular member having corresponding first ends and corresponding second ends;
   said at least one elastic radial stop means being disposed at at least one of said first ends and said second ends;
   said at least one elastic radial stop means extending from said outer tubular member toward said inner tubular member;
   said at least one elastic radial stop means including an extended end which is radially spaced from said inner tubular member by a predetermined radial distance; and
   said bearing further including wedge means disposed between said extended end of said at least one elastic radial stop means and said inner tubular member, wherein said wedge means is selectively removable and includes a radial height, said radial height is selected to be at least one of greater than said predetermined radial distance and less than said predetermined radial distance, said radial height being greater than said predetermined radial distance causes said at least one elastic radial stop means to be resiliently deformed by said wedge means to produce a radial force on said inner tubular and said outer tubular member, and said radial height being less than said predetermined radial distance is for limiting a movement of said extended end of said at least one elastic radial stop means toward said inner tubular member prior to any resilient deformation of said at least one elastic radial stop means.

2. The bearing according to claim 1, wherein said wedge means is secured to a retaining ring and said retaining ring is removably mounted around said inner tubular member.

3. The bearing according to claim 2, wherein said inner tubular member has anon-cylindrical outer shape and said retaining ring has an opening therethrough which has an inner shape corresponding to said outer shape for receipt of said retaining ring on said outer shape of said inner tubular member.

4. The bearing according to claim 2, wherein said at least one elastic radial stop means includes two stops, said two stops are disposed on circumferentially opposite regions of said outer tubular member at said at least one of said first ends and said second ends, said retaining ring includes said wedge means in the form of two wedges, and said two wedges are respectively radially aligned with said two stops when said retaining ring is mounted on said inner tubular member at said at least one of said first ends and said second ends.

* * * * *